June 30, 1931.   B. H. BROWALL   1,811,913
AUTOMATIC SLACK ADJUSTER FOR BRAKES
Filed April 22, 1930   2 Sheets-Sheet 1
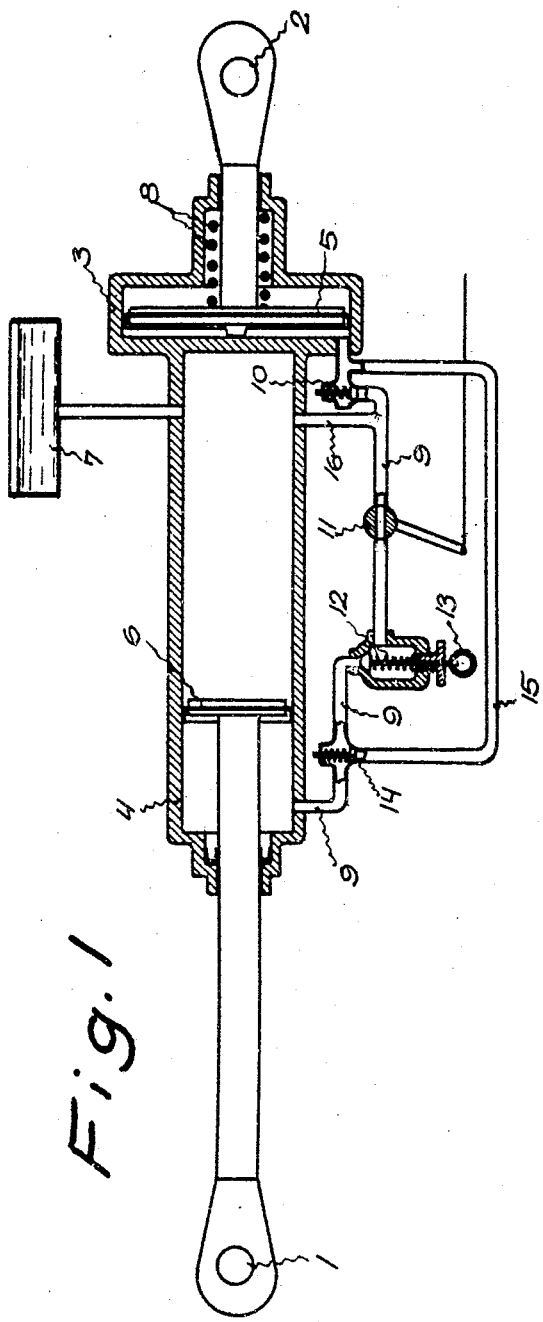
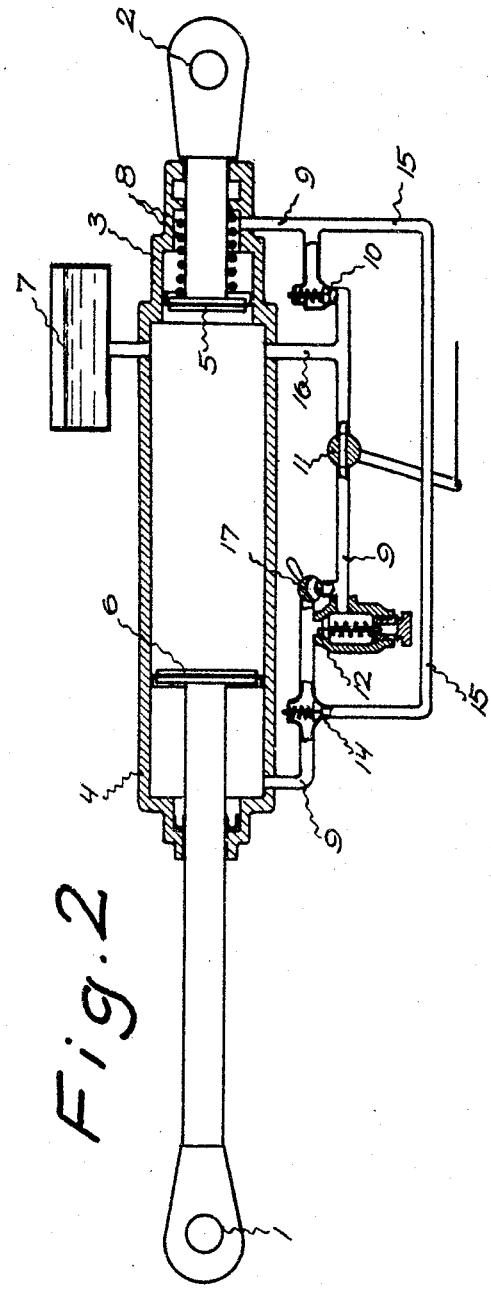
B. H. Browall
INVENTOR
By: Marks & Clerk
ATTYS.

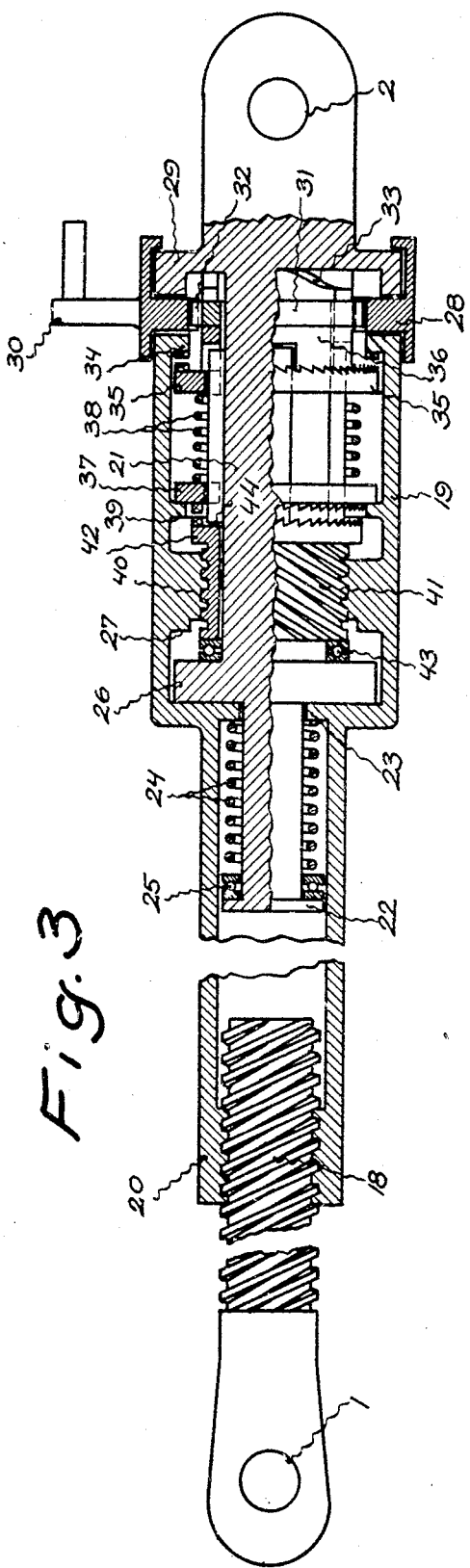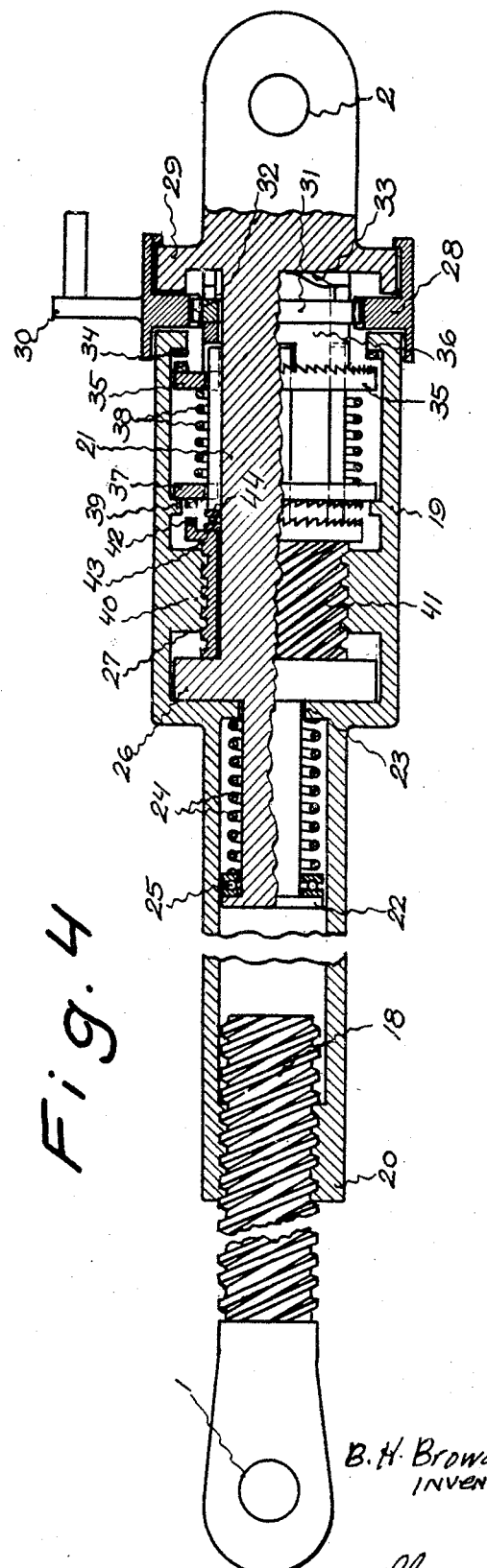

Patented June 30, 1931

1,811,913

UNITED STATES PATENT OFFICE

BERT HENRY BROWALL, OF MALMO, SWEDEN, ASSIGNOR TO SVENSKA AKTIEBOLAGET BROMSREGULATOR, OF MALMO, SWEDEN, A CORPORATION OF SWEDEN

AUTOMATIC SLACK ADJUSTER FOR BRAKES

Application filed April 22, 1930, Serial No. 446,335, and in Germany July 10, 1929.

My present invention refers to an automatic slack adjuster for brakes on power driven vehicles and especially for brakes on railway cars and the like.

In the prior art in this connection it has been proposed to provide automatic slack adjusters adapted both for reduction of too large slacks between the brake shoes and the wheels, as when compensating for wear, and for increasing of too small slacks between said brake shoes and wheels, whereby the increase of too small slacks has been effected by means of the stresses then arising in the brake rigging too early during a braking process, such increase being limited by a locking mechanism the action of which is determined by a certain length of the brake piston stroke.

The object of my present invention is to provide an apparatus of the type referred to above, and wherein also the reduction of too large slacks is effected by means of the stresses arising in the brake rigging when braking, so that the driving means adapted to actuate the apparatus for the purpose of reducing too large slacks is independent of the length of the brake piston stroke. For such purpose the aforesaid driving means, according to the invention, is constructed in such a manner that the movement, which is to be utilized in the apparatus for the reduction of the slacks, is transmitted to the same by a relative displacement of its parts due to the stresses arising in the brake rigging when braking. Thereby such parts of the driving means, which are adapted to actuate the adjusting means in a direction for reduction of too large slacks, and for such purpose are to be displaced relative to each other, are displaceable in counteraction of suitable spring means, so that said parts, by spring action are returned to their original relative position when the stress is relieved from the brake rigging at the release of the brakes.

The invention is illustrated in the accompanying drawings which show four different embodiments thereof, all of which are shown in longitudinal section through the slack adjuster. In the drawings:—

Fig. 1 shows the first embodiment of invention referring to an apparatus adapted to be actuated by fluid pressure, and Fig. 2 shows a modification of said first embodiment.

Fig. 3 shows a third embodiment of the invention and refers to an apparatus adapted to be actuated by mechanical means, and Fig. 4 shows a modification of Fig. 3.

Besides it is to be noted that Fig. 3 refers to a mechanical equivalent to the hydraulic apparatus according to Fig. 1, and Fig. 4 in the same manner is a mechanical equivalent to the hydraulic apparatus shown in Fig. 2. All of the embodiments shown are arranged so as to be used in pull-rods, but corresponding constructions may of course be made for use in push-rods.

Similar references are used in all of the figures on corresponding parts of construction, and 1 and 2 respectively refer to the connection eyes for the brake rigging rod of which the slack adjuster is intended to be an integral part, so that a variation of the distance between such connection eyes will cause a corresponding variation of the slack between the brake shoes and the wheels.

In the embodiment according to Fig. 1 the apparatus consists of two rigidly interconnected pressure fluid cylinders, i. e. a shorter cylinder 3 and a longer cylinder 4, and thereby the shorter cylinder 3 may be of a greater diameter than the longer one. A piston 5 is reciprocably mounted within the cylinder 3 and connected with the eye 2, the cylinder 4 being also provided with a reciprocable piston 6 connected with the eye 1. The cylinder chamber located at the inner side of the piston 6 forms a storage container for the fluid to be used, and such storage chamber can be in permanent communication with a filling chamber or container 7. The piston 5 is permanently acted upon by a return spring 8 acting in opposition to the stress arising between the eyes 1 and 2 during braking.

The cylinder chamber at the inner side of the piston 5, by means of a pipe 9, stands in connection with the chamber within the cylinder 4 at hand at the outer side of the piston 6, and counted in the direction from the cylinder 3 this pipe is provided with a spring pressed non-return valve 10 closing in the direction towards the cylinder 4, a cock 11, a spring pressed over-flow valve 12 provided with an exterior handle 13, and finally nearest to the cylinder 4 a spring pressed non-return valve 14 closing in the direction towards a branch pipe 15 extending from the pipe 9 at a point between the valve 12 and the cylinder 4, the other end of such branch pipe being also connected with the pipe 9 at a point between the valve 10 and the cylinder 3, or even directly connected with the last mentioned cylinder. The cock 11 is positively connected with a suitable part of construction set into movement by the brake piston when braking in such a manner that the cock will be closed when the brake piston has travelled a predetermined length of idle stroke corresponding to normal slacks. When the brake is released, the cock 11 is open.

Further the pipe 9, at a point between the valve 10 and the cock 11, by means of a pipe 16 is connected with the storage container for the fluid to be used. The valve 12 is acted upon by a rather strong closing spring, preferably combined with suitable means for adjusting the strength of the spring pressure, such spring permitting the opening of the valve only after that the braking stress and consequently also the pressure within the cylinder 4 have reached a certain predetermined value.

The manner of action of the apparatus described above is as follows:—

When performing a braking, a tensional stress arises between the connection eyes 1 and 2, and counteracted by the spring 8 the piston 5 will be drawn outwardly in the cylinder 3, whereby a certain amount of fluid is sucked in by the valve 10 through the pipes 9 and 16. No fluid can be sucked in through the pipe 15, as the same is closed by the valve 14, and through the continuation of the pipe 9 can neither any fluid be sucked in on account of the strong spring action on the valve 12.—During the part of the adjusting process just described, the piston 5 will be positioned in readiness for a reduction of the slack by means of the amount of fluid sucked in.

At a continuation of the braking, the stress between the connection eyes 1 and 2 is increasing, and the further functioning of the apparatus is dependent on the amount of slack at hand. If the slack is normal, the increased tensional stress between the eyes 1, 2 will appear substantially at the same time as the cock 11 has been closed, i. e. when the brake piston has travelled its idle stroke length corresponding to normal slacks, and thereby the fluid within the cylinder 4 will be trapped, so that the distance between the connection eyes will be kept constant. If the brake is thereafter released and the tensional stress spoken of relieved, the return spring 8 acting upon the piston 5 will press the amount of fluid kept in readiness back into the cylinder 4 by means of the pipe 15 and the valve 14, and the piston 6 moves inwardly in its cylinder (perhaps by pressing back a certain amount of fluid into the storage container 7); so that a reduction of the distance between the connection eyes 1, 2, and hereby a reduction of the amount of slack, takes place, due to which fact the slack is too small when performing the next braking, and is to be increased in the manner nearer disclosed below.

In case the slack is too small, the piston 5 will act in the same manner as described above, but since the slack is too small, the increased tensional stress between the connection eyes 1, 2 will appear previous to the moment at which the brake piston has travelled its idle length of stroke corresponding to normal slack, i. e. before the cock 11 has been closed. The result hereof is, that the increased stress causes an increased pressure within the cylinder 4, such pressure opening the valve 12, and by means of the cock 11, which is still open, a certain amount of fluid will be returned to the storage container during the displacement of the piston 6, so that the slack is again increased. This manner of action will continue until the brake piston has travelled its normal length of idle stroke corresponding to normal slack, so that the cock 11 has been closed, and thereafter no further return of fluid to the container can occur.

Finally, if the amount of slack is too great, the brake piston will travel its normal length of idle stroke previous to the appearance of any considerable tensional stress in the brake rigging, or between the connection eyes 1, 2, and therefore the cock 11 will be closed at an earlier moment. The piston 6 is consequently prevented from returning any amount of fluid to the storage container, and when releasing the brake the amount of fluid introduced by the piston 5 will reduce the slack with a value corresponding to amount of fluid sucked in.

From the foregoing it will be understood, that the apparatus, independent of the actual amount of slack, will perform a reduction of the slack by means of the piston 5 at each braking operation, and if such reduction of slack will be eliminated or withheld will depend of, if a sufficient tensional stress in the brake rigging has appeared or not at the moment, at which the cock 11 is closed. As the moment of closing of the cock 11 is directly dependent on the position of the brake piston in its cylinder (not shown), the apparatus will naturally provide for a constant length of idle stroke of the brake piston, whereby the amount of slack between the brake shoes and the wheels will also be kept constant.

The purpose of the exterior handle 13 on the valve 12 is to permit the manual opening of such valve if desired, for instance if the slack, from one reason or another, is to be manually varied, such as when substituting worn brake shoes by new ones. Obviously, the brake will then be in released position and the cock 11 be open, and by opening of the valve 12 the piston 6 can be moved anywhere in its cylinder so that the amount of slack is correspondingly varied.

It will also be understood from above that the apparatus according to Fig. 1 at each braking is brought in readiness for reduction of the slack, such reduction being not performed, however, until the brake is released. The embodiment of invention shown in Fig. 2 is functioning in a similar manner, the only difference being that the reduction of the slack is actually performed already during the braking.

In Fig. 2 the same references refer to similar parts of construction as in Fig. 1, and generally spoken the only difference is; that the piston 5 has a lesser diameter than the piston 6; that the pipe 9 is connected with the cylinder 3 at the outer side of the piston 6 therein; and that the ends of the cylinders 3, 4 facing each other are in permanent communication. A difference with regard to the particulars is also that the valve 12 cannot be opened by exterior influence, but instead thereof it is combined with a by-pass pipe provided with a manually operable cock 17. In this connection it is to be noted that the embodiment according to Fig. 1 could also have been constructed according to the same modification, or else the embodiment shown in Fig. 2 could have been provided with the manually operable valve 12 shown in Fig. 1 instead of the interruptable by-pass connection actually shown.

The manner of action of the apparatus according to Fig. 2 is as follows:—

When the piston 5 is drawn outwardly due to the stress arising between the connection eyes 1, 2 when braking, a certain amount of fluid will be positively pressed through the pipe 15 and the valve 14 into the cylinder 4, as the area of the piston 5 is smaller than that of the piston 6, and the specific pressure in the cylinder 3 will consequently be greater than the corresponding pressure within the cylinder 4. Hence, the piston 6, when braking, will move towards the inner end of the cylinder 4 and perform a corresponding reduction of the slack. The continued operation will be dependent on the actual amount of slack at hand.

If the slack is too great, the brake piston will have performed its idle length of stroke corresponding to normal slack and the cock will have been closed before the braking stress in the rigging has reached a value corresponding to the value of pressure required for opening of the valve 12, and consequently the piston 6 has not been able to transmit any amount of fluid to the storage container, due to which fact the reduction of the slack performed by the piston 5 will be withheld. If the slack is too small, a sufficient tensional stress will arise between the connection eyes 1, 2 previous to the moment at which the cock 11 closes, and the piston 6, by the intermediary of the valve 12 and the cock 11, will then press back a greater volume of fluid to the storage container than the volume pressed in by the piston 5, the result being that the slack is increased. Finally, if the slack has its normal value, the aforesaid tensional stress will arise at such a moment in relation to the closing moment of the cock 11, that the piston 6 presses back the same amount of fluid to the storage container as the volume pressed in by the piston 5, and the slack will maintain its normal value. In all circumstances the piston 5 will be returned into its original position by influence from the spring 8 when releasing the brake, and thereby said piston, by the intermediary of the pipe 9, the valve 10 and the pipe 16, sucks in a new amount of fluid.

As stated above, the embodiment according to Fig. 3 forms a mechanical equivalent to the hydraulic apparatus according to Fig. 1, and for a better understanding of this fact it is to be remembered that the piston 5 in the embodiment according to Fig. 1 caused a certain amount of fluid to be kept in readiness, such fluid at the release of the brake causing a reduction of the slack, and that the moment at which a tensional stress arised in the apparatus when braking, i. e. the length of the idle stroke of the brake piston in relation to the moment of closing of the cock 11, was determining for the extent to which the reduction of the slack performed was to be utilized. An exactly corresponding condition is at hand with regard to the embodiment of the slack adjuster shown in Fig. 3, and therein the power for performing the reduction of the slack in a similar manner is accumulated by a spring compressed due to the braking stress, and the moment at which the braking stress arises in relation to the actuation of a locking device corresponding to the cock 11 is determining for the condition whether the reduction of the slack is to be maintained, more or less, or not.

In both of the embodiments according to Figs. 3 and 4 it is assumed that the adjustment of the slack is performed by means of a nut and screw connection known per se, and the part of the brake rigging rod connected with the connection eye 1, in which rod part the slack adjuster is mounted, is given the form of a screw 18, around which the rotatable casing 19 of the apparatus forms a nut 20. Further it can be assumed that the nut and screw connection 18, 20 has a pitch that is not self-locking, i. e. a pitch which is so large that an axial pull (or push) applied to the members causes a relative rotation of the same. In a manner known per se, the housing 19 is also rotatably mounted on the other part of the rod connected with the eye 2, such rod part within the apparatus forming a pivot pin 21. A pressure spring 24 is inserted between a flange 22 provided at the inner end of the pin 21 and a fixed flange 23 in the interior of the housing 19, such pressure spring acting in contradiction to the stress arising in the combined brake rigging rod and apparatus when braking. At one or both ends the abutment faces or seats for said spring may be supported by antifriction bearings 25 for the purpose of minimizing the resistance against a relative rotation of the parts. The pivot pin 21 is further provided with another flange 26 which by means of the spring 24 is kept into frictional engagement with the flange 23, or another fixed abutment face within the housing 19, when the brake is released, and the housing is provided with still another abutment face 27 contacting with the flange 26, when the spring 24 is compressed due to the braking stress, such last mentioned abutment face being adapted for taking up the braking stress. The particulars of the apparatus described above may be considered to be previously known and form no part of the invention otherwise than in combination with the other parts to be described.

A ring or annulus 28 is freely rotatably mounted on the pivot pin 21, such ring being in contact with a flange 29 on the connection eye 2 and connected with a lever 30, which in a manner known per se is caused to get an oscillatory rotating movement when braking by being connected with a suitable member of construction set into movement by the brake piston, and thereby the said lever 30 when braking is rocked in one direction and when releasing the brake rocked back again, the length of stroke of the brake piston being determining for the maximal angle of oscillation.

Within the interior of the apparatus another ring or annulus 31 is rotatably mounted around the pivot pin 21, such ring by means of a slidable slot and key connection 32 being axially displaceably but non-rotatably connected with the ring 28, and the ring 31 at the side facing the connection eye 2 is provided with oblique cam faces 33 coacting with corresponding fixed cam faces on the flange 29 for the purpose of causing an axial displacement of the ring 31 at a rotation of the rings 28, 31. At the end facing the connection eye 2, the housing 19 is provided with an inwardly extending flange formed into a circular row of teeth 34 facing the interior of the apparatus, such locking teeth being adapted for coaction with a corresponding toothed ring or annulus 35, which by means of a slidable slot and key connection is axially displaceably but non-rotatably mounted on the pin 21. Between the annulus 31 and 35 is mounted a supporting ring 36, which also can be carried out in one piece with the annulus 35 so that the latter will get an L-shaped cross section profile. As shown in the drawing, the supporting ring 36 is of such a length that the locking means 34, 35 are disengaged when the brake is released.

Further, within the apparatus, an annulus 37 provided with locking teeth, by means of a slidable slot and key connection, is axially displaceably but non-rotatably mounted on the pin 21, and between the locking rings 35 and 37 is inserted a pressure spring 38 tending permanently to push the rings away from each other. The ring 35 will thereby be pressed against the rings 36 and 37 and the cam faces 33, but the ring 37 will rest against a fixed abutment 39 within the housing 19. Further, the interior of the housing 19 between the abutments 27 and 39 is shaped as a nut 40 around a screw threaded sleeve 41 mounted freely rotatably around the pin 21, the end of the said sleeve 41 facing the toothed ring 37 being provided with a corresponding circular row of locking teeth 42. An antifriction bearing 43 is mounted between the opposite end of the threaded sleeve 41 and the flange 26, the sleeve being interposed between said antifriction bearing and an abutment 44 formed on the pivot pin 21, an axial displacement of the sleeve on the pivot pin being in this manner prevented. It is to be noted that the pitch of the screw connection 40, 41 is chosen in such a manner that the said screw connection is not self-locking, the threads in the same having an opposite inclination to the threads in the screw connection 18, 20. It is also to be noted that the toothed locking clutch members 34, 35 and 37, 42 respectively act in the one direction of rotation only and in opposition to each other, the locking clutch 34, 35 acting for preventing the screwing out of the screw connection 18, 20 so as to prevent an increase of the slack when in engagement, the teeth of the other locking clutch 37, 42 having an opposite direction.

The manner of action of this apparatus last described is as follows:—

When braking, a tensional stress will arise between the connection eyes 1 and 2, and this stress tends to compress the spring 24, so that the contact pressure between the flanges 23 and 26 is relieved. Hereby the housing 19 of the apparatus will be free, and by means of the fixed screw 18 the tensional stress spoken of will cause the nut 20 and thereby also the housing to be rotated in a direction so that the nut is screwed out on the threaded rod coacting with the same. Thereby the brake rigging rod, in which the apparatus is mounted, will be lengthened and the slack will be increased. During the progress of the aforesaid action the lever 30 and the ring 28 have been given a rotating movement emanating from the brake piston, as described, and when the brake piston has travelled its normal length of idle stroke corresponding to a normal amount of slack, the cam faces 33 have been turned in relation to the corresponding fixed cam faces so much that the spring 38 can force the locking members 34, 35 into engagement, and then a further screwing out of the screw connection 18, 20 is prevented, i. e. in other words, the increase of the slack is stopped. During that phase of action described above, the easily turnable threaded sleeve 41 has taken part in the rotation of the housing 19, but when the latter is stopped by means of the locking means 34, 35 as described above, and when the tensional stress increases due to the progress of the braking, the spring 24 will be compressed and by means of the antifriction bearing 43 the flange 26 transmits an axial pressure to the threaded sleeve 41. As the housing 19 cannot now be further rotated, the said threaded sleeve must consequently be turned. By the axial displacement due to such turning movement of the sleeve 41 the locking clutch 37, 42 will be engaged, but such engagement does not prevent the further turning movement of the threaded sleeve 41, as the said clutch forms no stop against rotation in this direction, and when the teeth of the ring 42 slide backwardly on the toothed ring 37, the threaded sleeve 41 will be screwed further towards the right according to the drawing, until the flange 26 comes into contact with the abutment 27, so that said abutment takes up the tensional stress and all further movements within the apparatus cease. In this connection it is to be noted that the sleeve 41, at the axial displacement towards the right due to the turning of the same caused by the braking stress as described, will be positioned in readiness for a reduction of the slack. Compare the charging of the cylinder 3 according to Fig. 1 herewith.

At the release of the brake, the tensional stress between the connection eyes 1 and 2 will be gradually relieved, and thereby the spring 24 (exactly as the spring 8 according to Fig. 1) will be free to return the amount of work accumulated therein. As the locking clutch 37, 42 is in engagement, the threaded sleeve 41 cannot be slid back, and due to the axial pressure caused by the spring 24 between the pin 21 and the housing 19, the housing 19 will be turned back in a direction for reduction of the distance between the connection eyes 1, 2, i. e. in other words, in a direction for reducing the slack. The locking clutch 34, 35 cannot prevent this, as said clutch is inactive in that direction of rotation, but the teeth therein will slide backwardly on each other until that moment at which the clutch is disengaged by means of the cam surface 33. Immediately before the flanges 23 and 26 come into contact with each other again, the toothed ring 37 will be brought out of engagement with the toothed ring 42 by means of the abutment 39.

If the slack amounts to its normal value, the turning movement of the lever 30 and the ring 28 will be performed in such a manner that the locking clutch 34, 35 is engaged at a moment, at which the screw connection 18, 20 has performed so great a lengthening of the combined brake rigging rod as the shortening of said rod occurring due to the threaded sleeve 41 when releasing the brake. In case the slack is too small, the tensional braking stress will arise and the screwing out of the screw connection 18, 20 will begin at an earlier moment during the rocking movement of the lever 30. Consequently the screwing out begins earlier and amounts to a greater value than the screwing in caused by the threaded sleeve 41, and the difference corresponds to an increase of the slack. Further, as the entire progress of action is controlled by the lever 30 by the determination of the moment at which the locking clutch 34, 35 is engaged, the slack will be brought back to its normal value by one single braking operation only.

On the contrary, if the slack is too great, the tensional stress between the connection eyes 1, 2 arises at a later moment during the braking, and perhaps it does not arise until the locking clutch 34, 35 has been engaged. As evident from the explanations above, the result hereof will be that no screwing out will take place, and that the reduction of the slack performed by the threaded sleeve 41 will be maintained, and the maximal amount of reduction of the slack for each braking corresponds to the number of revolutions performed by the sleeve 41 multiplied with the pitch of the screw connection 18, 20.

The modification of invention shown in Fig. 4 is generally of the same construction as the one according to Fig. 3, but with regard to the manner of action it corresponds to the embodiment shown in Fig. 2. In Fig. 4 the same references are used on corresponding parts as in Fig. 3, and the difference apparent at first sight is only to be found therein that the antifriction bearing 43 is mounted at the opposite end of the threaded sleeve 41 abutting against the collar 44 on the pivot pin 21. Further the threads in the screw connection 40, 41 has the same inclination as those in the screw connection 18, 20, and an important difference not to be seen without a nearer examination is that the pitch of the screw connection 40, 41 is greater than the pitch of the screw connection 18, 20, the relative values of the pitches according to Fig. 3 being without importance. The purpose of the different pitches just described in connection with Fig. 4 is that the screw connection 40, 41 for the same axial stress shall cause a greater moment of torsion than the screw connection 18, 20 just as the piston 5 according to Fig. 2 must be given a smaller area than the piston 6, for the purpose of creating a greater specific pressure at the same tensional stress in the combined brake rigging rod.

The manner of action of the embodiment shown in Fig. 4 is as follows:—

When braking, a tensional stress arises between the connection eyes 1, 2, such stress tending to compress the spring 24 so that the contact pressure between the flanges 23 and 26 is relieved and an increase of the slack is performed in the same manner as described with reference to Fig. 3, this action going on until the locking clutch 34, 35 is engaged when the brake piston has travelled a predetermined length of idle stroke, as described above. At the compression of the spring 24 following thereupon, the threaded sleeve 41 is slid towards the right and the locking clutch 37, 42 is engaged. As the threads of the screw connection 40, 41 has an opposite inclination compared with the threads according to Fig. 3, but as said clutch still acts in the same direction, the rotating movement of the threaded sleeve 41 will at once be stopped. The result hereof is that the continued tensional stress, due to the greater pitch of the screw connection 40, 41 in comparison with the pitch of the screw connection 18, 20, by means of the threaded sleeve 41 will cause a rotation of the housing 19 and the nut 20 in relation to the screw 18 in a direction for reducing the slack. This action will continue until the flange 26 comes into contact with the abutment 27 and takes up the braking stress. The locking clutch 34, 35 has not been able to prevent a rotation of the housing 19 in a direction for reducing the slack, as it has no locking action in this direction of rotation, but the teeth therein will slide on each other. Hence, the slack will be reduced a certain amount when braking, such reduction of the slack, next time the brake is actuated, perhaps being followed by a greater or smaller increase of the slack again dependent on the arising of the braking stress previous to or after that moment at which the locking clutch 34, 35 is engaged.

At the release of the brake, the tensional stress between the connection eyes 1 and 2 is relieved, and the spring 24 is permitted to expand again, whereby such spring returns the parts of the screw connection 40, 41 into their original axial positions. Then the threaded sleeve 41 will be rotated in opposite direction, such rotation being not prevented by the locking clutch 37, 42, as described above, and this movement corresponds to the sucking in of fresh fluid into the cylinder 3 according to Fig. 2.

What I claim and desire to secure by Letters Patent is:—

1. In an automatic slack adjuster of the character described, means adapted for actuation of the adjuster in a direction for reduction of the slack when it is too great, means actuated by the braking stress when braking and adapted for actuation of the adjuster in an opposite direction when the slack is too small, locking means adapted for interruption of the lastmentioned actuation, means adapted for actuation of the said locking means at a moment corresponding to a predetermined length of idle stroke of the brake piston, and a driving means adapted for actuation of the adjuster in a direction for reduction of the slack, such driving means being arranged so that it gets the movement, which is to be transmitted to the adjuster for the purpose mentioned, by means of a relative displacement of its parts caused by the braking stress when braking.

2. Improvement in automatic slack adjusters according to claim 1, characterized in that the parts of the driving means, which are to be displaced for the purpose of actuation of the adjuster means in a direction for reduction of the slack, are yieldingly mounted in relation to each other in a manner so that the said displacement is performed in counteraction of the yielding means, and the returning of the parts of the driving means performed by said yielding means when the braking stress is relieved at the release of the brake.

In testimony whereof I have signed my name to this specification.

BERT HENRY BROWALL.